US010057679B2

(12) United States Patent
Fish

(10) Patent No.: US 10,057,679 B2
(45) Date of Patent: Aug. 21, 2018

(54) SYSTEMS AND METHODS OF REDUCING ACOUSTIC NOISE

(71) Applicant: Nortek Security & Control LLC, Carlsbad, CA (US)

(72) Inventor: Ram David Adva Fish, Menlo Park, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

(21) Appl. No.: 15/430,992

(22) Filed: Feb. 13, 2017

(65) Prior Publication Data

US 2017/0230749 A1 Aug. 10, 2017

Related U.S. Application Data

(63) Continuation of application No. 13/253,000, filed on Oct. 4, 2011, now Pat. No. 9,571,925.

(60) Provisional application No. 61/404,381, filed on Oct. 4, 2010.

(51) Int. Cl.
*G06F 17/00* (2006.01)
*H04R 1/40* (2006.01)
*H04R 3/00* (2006.01)

(52) U.S. Cl.
CPC ............ *H04R 1/406* (2013.01); *H04R 3/005* (2013.01); *H04R 2410/05* (2013.01); *H04R 2499/11* (2013.01)

(58) Field of Classification Search
CPC ............... H04R 3/005; H04R 2499/11; H04R 2430/23; H04R 1/406; H04R 15/00; H04R 2410/01; H04R 2499/15; H04R 25/407; H04R 29/005; H04R 5/04; H04R 1/08; H04R 2201/40; H04R 2201/403; H04R 2225/41; H04R 2430/25; H04M 2250/12; H04M 1/19; H04M 1/6041; H04M 1/05; H04M 1/0266; H04M 9/082
USPC ....... 381/91, 92, 122, 71.1, 77, 364; 700/94; 455/569.1, 563, 417, 404.1
See application file for complete search history.

(56) References Cited

U.S. PATENT DOCUMENTS 8,189,818 B2 * 5/2012 Takahashi .............. H04R 1/406 345/156
9,571,925 B1 2/2017 Fish
2006/0233389 A1 * 10/2006 Mao ....................... H04R 1/406 381/92

(Continued)

OTHER PUBLICATIONS

"U.S. Appl. No. 13/253,000, Advisory Action dated Jul. 31, 2015", 4 pgs.

(Continued)

*Primary Examiner* — Lun-See Lao
(74) *Attorney, Agent, or Firm* — Schwegman Lundberg & Woessner, P.A.

(57) ABSTRACT

A wearable device for detecting a user state is disclosed. The wearable device includes one or more of an accelerometer for measuring an acceleration of a user, a magnetometer for measuring a magnetic field associated with the user's change of orientation, and a gyroscope. The wearable device also includes one or more microphones for receiving audio. The wearable device may determine whether the orientation of the wearable device has changed and may designate or re-designate microphones as primary or secondary microphones.

20 Claims, 6 Drawing Sheets

(56) References Cited

U.S. PATENT DOCUMENTS

| | | | | |
|---|---|---|---|---|
| 2007/0058819 | A1 * | 3/2007 | Hertz | G11B 27/105<br>381/74 |
| 2008/0086227 | A1 * | 4/2008 | Hertz | A47G 19/025<br>700/94 |
| 2008/0146289 | A1 * | 6/2008 | Korneluk | H04M 1/6041<br>455/569.1 |
| 2010/0286567 | A1 | 11/2010 | Wolfe et al. | |
| 2014/0150530 | A1 | 6/2014 | Ten Kate | |

OTHER PUBLICATIONS

"U.S. Appl. No. 13/253,000, Examiner Interview Summary dated Feb. 5, 2015", 3 pgs.
"U.S. Appl. No. 13/253,000, Final Office Action dated May 18, 2015", 12 pgs.
"U.S. Appl. No. 13/253,000, Non Final Office Action dated Apr. 7, 2016", 13 pgs.
"U.S. Appl. No. 13/253,000, Non Final Office Action dated Nov. 19, 2014", 10 pgs.
"U.S. Appl. No. 13/253,000, Notice of Allowance dated Sep. 28, 2016", 5 pgs.
"U.S. Appl. No. 13/253,000, Response filed Jul. 7, 2016 to Non Final Office Action dated Apr. 7, 2016", 11 pgs.

* cited by examiner

SYSTEMS AND METHODS OF REDUCING ACOUSTIC NOISE

CROSS-REFERENCE TO RELATED APPLICATIONS

This application claims the benefit of U.S. Provisional Patent Application No. 61/404,381, filed Oct. 4, 2010, entitled "SYSTEM TO REDUCE ACOUSTIC NOISE BASED ON MULTIPLE MICROPHONES, ACCELEROMETERS AND GYROS," the disclosure of which is incorporated herein by reference in its entirety.

TECHNICAL FIELD

Embodiments of the present invention relate generally to devices with one or more microphones, and more particularly, to systems and methods for reducing background (e.g., ambient) noise detected by the one or more microphones.

BACKGROUND

Electronic devices, such as cell phones, personal digital assistants (PDAs), smart phones, communication devices, computing devices (e.g., desktop computers and laptops) often have microphones to detect, receive, record, and/or process sound. For example, a cell phone/smart phone may use a microphone to detect the voice of a user for a voice call. In another example, a PDA may have a microphone to allow a user to dictate notes or leave reminder messages. The microphones on the electronic devices may also detect noise, in addition to detecting the desired sound. For example, the microphone on a communication device may detect a user's voice (e.g., desired sound) and background noise (e.g., ambient noise, wind noise, other conversations, traffic noise, etc.).

One method of reducing such background noise is to use two microphones to detect the desired sound. A first microphone is positioned closer to the desired sound source (e.g., closer to a user's mouth). The first microphone is designated as the primary microphone and is generally used to detect the desired sound (e.g., the user's voice). A second microphone is positioned farther away from the desired sound source than the first microphone. The second microphone is designated as a secondary microphone and is generally used to detect the background (e.g., ambient) noise. The second microphone may also detect the desired sound as well, but the intensity (e.g., the volume) of the desired sound detected by the second microphone will generally be lower than the intensity of the desired sound detected by the first microphone. By subtracting the signals (e.g., the sound) received by the second microphone from the signals (e.g., the sound) received from the first microphone, a communication device may use the two microphones to reduce and/or cancel the background noise detected by the two microphones.

Generally, when two microphones are used to reduce the background noise, the microphone designations or assignments are permanent. For example, if the second microphone is designated the primary microphone and the first microphone is designated the secondary microphone, these assignments generally will not change.

BRIEF DESCRIPTION OF THE DRAWINGS

Embodiments of the present invention will be more readily understood from the detailed description of exemplary embodiments presented below considered in conjunction with the attached drawings in which like reference numerals refer to similar elements and in which.

DETAILED DESCRIPTION

Embodiments of the invention provide a wearable device configured to designate a first microphone as a primary microphone for detecting sound for a desired source, and a second microphone as a secondary microphone for detecting background noise. The wearable device may include an accelerometer for measuring an acceleration of the user, a magnetometer for measuring a magnetic field associated with the user's change of orientation, a microphone for receiving audio, a memory for storing the audio, and a processing device ("processor") communicatively connected to the accelerometer, the magnetometer, the microphone, and the memory. The wearable device periodically receives measurements of acceleration and/or magnetic field of the user and stores the audio captured by the first microphone and/or second microphone in the memory. The wearable device is configured to obtain orientation data (e.g., acceleration measured by the accelerometer and/or a calculated user orientation change based on the magnetic field measured by the magnetometer). The wearable device may use the orientation data to determine which of the first microphone and the second microphone should be re-designated as the primary microphone and secondary microphone.

In one embodiment, the wearable device further comprises a gyroscope. The wearable device calculates a change of orientation of the user based on orientation data received from the gyroscope, the magnetometer, and the accelerometer. This calculation may be more accurate than a change of orientation calculated based on orientation data received from the magnetometer and accelerometer alone. The wearable device may further comprise a speaker and a cellular transceiver, and the wearable device can employ the speaker, the microphones, and the cellular transceiver to receive a notification and an optional confirmation from a voice conversation with a call center or the user.

In one embodiment, a wearable device is configured to detect a predefined state of a user based on the accelerometer's measurements of user acceleration, the magnetometer's measurements of magnetic field associated with the user's change of orientation, and audio received from the microphones. The predefined state may include a user physical state (e.g., a user fall inside or outside a building, a user fall from a bicycle, a car incident involving a user, etc.) or an emotional state (e.g., a user screaming, a user crying, etc.). The wearable device is configured to declare a measured acceleration and/or a calculated user orientation change based on the measured magnetic field as a suspected user state. The wearable device may then use audio to categorize the suspected user state as an activity of daily life (ADL) (e.g., normal walking/running), a confirmed predefined user state (e.g., a slip or fall), or an inconclusive event.

Figure 1:
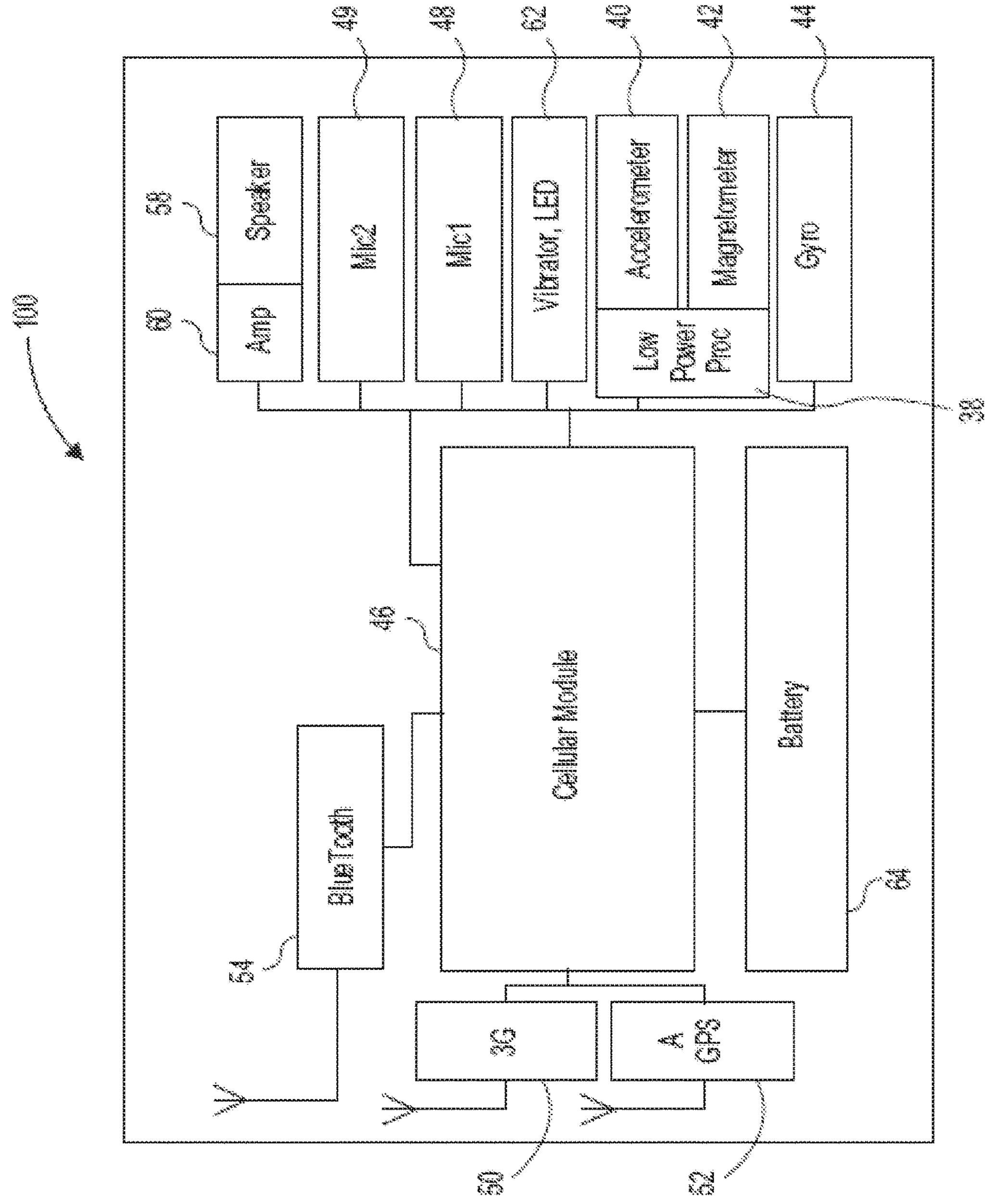
FIG. 1 is a block diagram of the components of a wearable device, according to an embodiment of the present invention.

FIG. 1 is a block diagram of the components of a wearable device 100, according to an embodiment of the present invention. The wearable device 100 may include a low-power processor 38 communicatively connected to an accelerometer 40 (e.g., a 3-axis accelerometer) for detecting acceleration events (e.g., high, low, positive, negative, oscillating, etc.), a magnetometer 42 (preferably a 3-axis magnetometer), for assessing a magnetic field of the wearable device 12*a*, and an optional gyroscope 44 for providing a more precise short term determination of orientation of the wearable device 100. The low-power processor 38 is configured to receive continuous or near-continuous real-time measurement data from the accelerometer 40, the magnetometer 42, and the optional gyroscope 44 for rendering tentative decisions concerning predefined user states. By utilizing the above components, the wearable device 100 is able to render these decisions in relatively low-computationally expensive, low-powered manner and minimize false positive and false negative errors. A cellular module 46, such as the 3G IEM 6270 manufactured by QCOM, includes a high-computationally-powered microprocessor element and internal memory that are adapted to receive the suspected fall events from the low-power processor 38 and to further correlate orientation data received from the optional gyroscope 44 with digitized audio data received microphones 48 and 49 (preferably, but not limited to, a micro-electro-mechanical systems-based (MEMS) microphone(s)). The audio data may include the type, number, and frequency of sounds originating from the user's voice, the user's body, and the environment.

In one embodiment, the microphones 48 and 49 may be used to detect sounds (e.g., user's voice) and to reduce background noise detected by the microphones 48 and 49. Each of the microphones 48 and 49 may be designated as a primary or secondary microphone. When the wearable device 100 determines, based on orientation data, that a change in orientation has occurred, the wearable device 100 may re-designate the microphones 48 and 49 as primary or secondary microphones. The re-designation of the microphones 48 and 49 provides enhanced noise reduction and/or cancellation because the change in the orientation of the device may change the distance between microphones 48, 49, and the desired sound source. Re-designating the microphone closest to the desired sound source as a primary microphone and the microphone farther away from the sound source as a secondary microphone may enhance noise reduction and/or cancellation.

The cellular module 46 may receive/operate a plurality of input and output indicators 62 (e.g., a plurality of mechanical and touch switches (not shown), a vibrator, LEDs, etc.). The wearable device 100 also includes an on-board battery power module 64. The wearable device 100 may also include empty expansion slots (not shown) to collect readings from other internal sensors (i.e., an inertial measurement unit), for example, a pressure sensor (for measuring air pressure, i.e., attitude) or heart rate, blood perfusion sensor, etc.

It should be noted that although a wearable device is shown in FIG. 1, other embodiments of the invention may be implemented and/or used on a variety of types of devices. These devices may include, but are not limited to, cell phones, PDAs, smart phones, communication devices, computing devices (e.g., desktop computers and laptops), recording devices (e.g., digital voice recorders), and any device which uses multiple microphones.

In one embodiment, the wearable device 100 may operate independently (e.g., without the need to interact with other devices or services). In another embodiment, the wearable device 100 may interact with other devices and services, such as server computers, other wireless devices, a distributed cloud computing service, etc. For example, the cellular module 46 may be configured to receive commands from and transmit data to a distributed cloud computing system via a 3G or 4G transceiver 50 over a cellular transmission network. The cellular module 46 may further be configured to communicate with and receive position data from an a GPS receiver 52, and to receive measurements from the external health sensors 18*a*-18*n* via a short-range BlueTooth transceiver 54. In addition to recording audio data for event analysis, the cellular module 46 may also be configured to permit direct voice communication between the user 16*a* and a call center, first-to-answer systems, or care givers and/or family members via a built-in speaker 58 and an amplifier 60.

In one embodiment, the wearable device 100 may use the sound received by the microphones 48 and 49 to determine whether change in the orientation of the device (e.g., a suspected user state) is an actual predefined user state (e.g., a fall). The wearable device 100 may re-designate the microphones 48 and 49 based on the change in the orientation of the device, in order to provide enhanced noise cancellation and/or reduction, in order to better capture sounds from the microphones 48 and 49. For example, a user of the wearable device may yell or scream after slipping/falling. The wearable device 100 may re-designate the microphones 48 and 49 as primary or secondary microphones, to better detect the sounds of the user's voice. Based on the sounds detected by the microphones 48 and 49, the wearable device 100 may determine that a suspected user state is an actual user state (e.g., an actual fall). The wearable device may also send the sound and orientation data to the distributed cloud computing system for further processing to determine whether a suspected user state is an actual user state (e.g., an actual fall).

Figure 2:
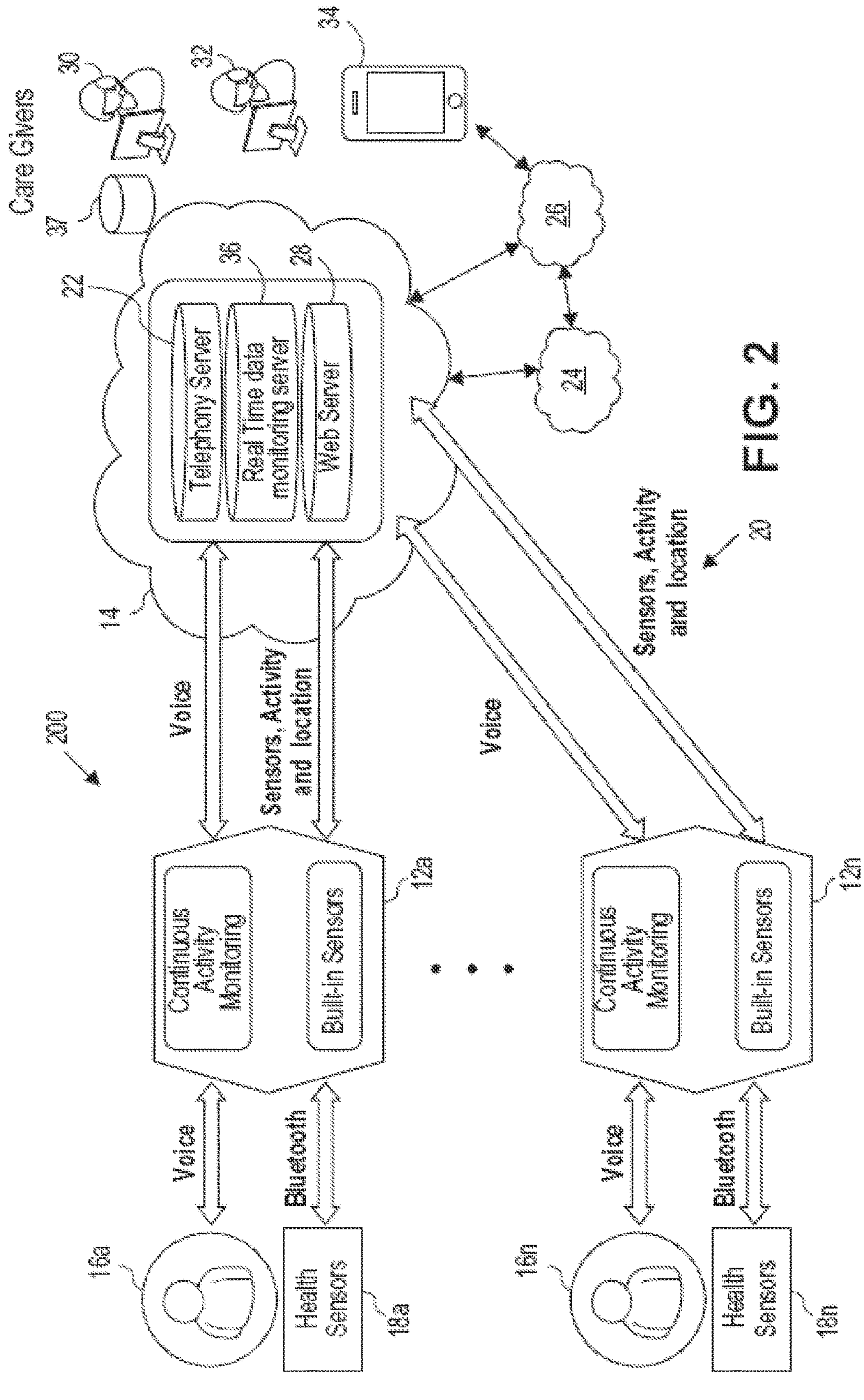
FIG. 2 depicts an exemplary system for detecting a fall which uses the wearable device of FIG. 1, according to an embodiment of the present invention.

FIG. 2 depicts an exemplary system 200 for detecting a fall which uses the wearable device of FIG. 1, according to an embodiment of the present invention. The system 200 includes wearable devices 12*a*-12*n* communicatively connected to a distributed cloud computing system 14. A wearable device 12 may be a small-size computing device that can be wearable as a watch, a pendant, a ring, a pager, or the like, and can be held in multiple orientations.

In one embodiment, each of the wearable devices 12*a*-12*n* is operable to communicate with a corresponding one of users 16*a*-16*n* (e.g., via a microphone, speaker, and voice recognition software), external health sensors 18*a*-18*n* (e.g., an EKG, blood pressure device, weight scale, glucometer) via, for example, a short-range OTA transmission method (e.g., BlueTooth), and the distributed cloud computing system 14 via, for example, a long range OTA transmission method (e.g., over a 3G or 4G cellular transmission network 20). Each wearable device 12 is configured to detect predefined states of a user. The predefined states may include a user physical state (e.g., a user fall inside or outside a building, a user fall from a bicycle, a car incident involving a user, a user taking a shower, etc.) or an emotional state (e.g., a user screaming, a user crying, etc.). The wearable device 12 may include multiple sensors for detecting predefined user states. For example, the wearable user device 12 may include an accelerometer for measuring an acceleration of the user, a magnetometer for measuring a magnetic field associated with the user's change of orientation, and one or more microphones for receiving audio. Based on data received from the above sensors, the wearable device 12 may identify a suspected user state, and then categorize the suspected user state as an activity of daily life (ADL), a confirmed predefined user state, or an inconclusive event. The wearable user device 12 may then communicate with the distributed cloud computing system 14 to obtain a re-confirmation or change of classification from the distributed cloud computing system 14.

Cloud computing may provide computation, software, data access, and storage services that do not require end-user knowledge of the physical location and configuration of the system that delivers the services. The term "cloud" may refer to a plurality of computational services (e.g., servers) connected by a computer network.

The distributed cloud computing system 14 may include one or more computers configured as a telephony server 22 communicatively connected to the wearable devices 12*a*-12*n*, the Internet 24, and one or more cellular communication networks 20, including, for example, the public circuit-switched telephone network (PSTN) 26. The distributed cloud computing system 14 may further include one or more computers configured as a Web server 28 communicatively connected to the Internet 24 for permitting each of the users 16*a*-16*n* to communicate with a call center 30, first-to-answer systems 32, and care givers and/or family 34. The distributed cloud computing system 14 may further include one or more computers configured as a real-time data monitoring and computation server 36 communicatively connected to the wearable devices 12*a*-12*n* for receiving measurement data, for processing measurement data to draw conclusions concerning a potential predefined user state, for transmitting user state confirmation results and other commands back to the to the wearable devices 12*a*-12*n*, and for storing and retrieving present and past historical predefined user state feature data from a database 37 which may be employed in the user state confirmation process, and in retraining further optimized and individualized classifiers that can in turn be transmitted to the wearable device 12*a*-12*n*.

As discussed above, wearable devices 12*a*-12*n* may comprise other types of devices such as cell phones, smart phones, computing devices, etc. It should also be noted that although devices 12*a*-12 are shown as part of system 200, any of the devices 12*a*-12*n* may operate independently of the system 200, when designating and re-designating microphones as primary or secondary microphones. As discussed above, the re-designation of the microphones 48 and 49 provides enhanced noise reduction and/or cancellation because the change in the orientation of the device may change the distance between microphones 48, 49, and the desired sound source. Re-designating the microphone closest to the desired sound source as a primary microphone and the microphone farther away from the sound source as a secondary microphone may enhance noise reduction and/or cancellation.

Figure 3A:
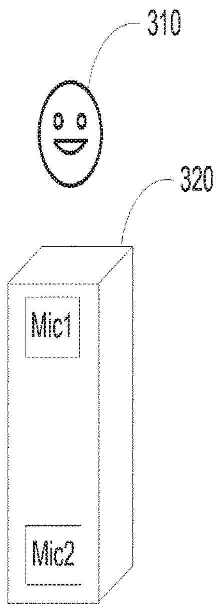
FIGS. 3A-3C are block diagrams illustrating different orientations of a wearable device, relative to a user, according to different embodiments.

FIG. 3A is a block diagram illustrating a first orientation of a wearable device 320, relative to a user 310, according to one embodiment. The user 310 may be a desired source of sound (e.g., the user's voice is the desired sound). The wearable device 320 comprises two microphones "Mic1" and "Mic2." Mic1 is located at the top of the wearable device 320 and Mic2 is located at the bottom of the wearable device 320. It should be noted that in other embodiments, Mic1 and Mic2 may be located at any location of the wearable device 320.

As shown in FIG. 3A, Mic1 is the closest microphone to the user 310. The wearable device 320 may determine that Mic1 is closer to the user 310 than Mic2. The wearable device 320 may designate Mic1 as a primary microphone for detecting sound for the user 310 and may designate Mic2 as a secondary microphone for detecting background noise. The two microphones Mic1 and Mic2 may be used to reduce (e.g., cancel out) the background noise from the detected sounds.

Figure 3B:
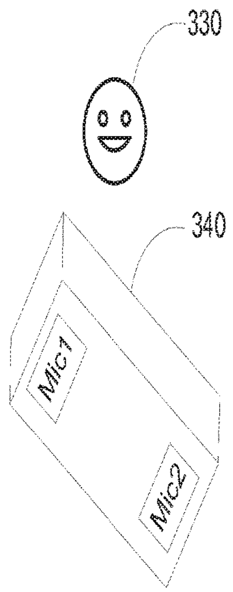

FIG. 3B is a block diagram illustrating a second orientation of a wearable device 340, relative to a user 330, according to another embodiment. The user 330 may be a desired source of sound (e.g., the user's voice is the desired sound). The wearable device 340 comprises two microphones "Mic1" and "Mic2." Mic1 is located at the top of the wearable device 340 and Mic2 is located at the bottom of the wearable device 340. It should be noted that in other embodiments, Mic1 and Mic2 may be located at any location of the wearable device 340.

As shown in FIG. 3B, although the wearable device 340 is tilted towards the left (e.g., the device 340 is now diagonal) Mic1 is still the closest microphone to the user 330. The wearable device 340 may obtain data associated with the orientation or the change in orientation of the wearable device 340 (e.g., orientation data). The orientation data may be obtained from one or more of a gyroscope, a magnetometer, and an accelerometer of the wearable device 340. Based on the orientation data, the wearable device 340 may determine that the orientation of the wearable device 340 has changed (e.g., the device 340 has tilted towards the left). The wearable device 340 may determine that Mic1 is closer to the user 310 than Mic2. The wearable device 340 may continue to designate Mic1 as a primary microphone for detecting sound for the user 330 and continue to designate Mic2 as a secondary microphone for detecting background noise. The two microphones Mic1 and Mic2 may be used to reduce (e.g., cancel out) the background noise from the detected sounds.

Figure 3C:
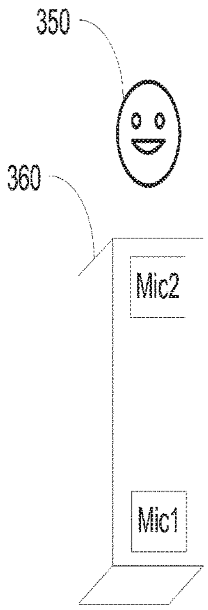

FIG. 3C is a block diagram illustrating a third orientation of a wearable device 360, relative to a user 350, according to a further embodiment. The user 350 may be a desired source of sound (e.g., the user's voice is the desired sound). The wearable device 360 comprises two microphones "Mic1" and "Mic2." Mic1 is located at the top of the wearable device 360 and Mic2 is located at the bottom of the wearable device 360. It should be noted that in other embodiments, Mic1 and Mic2 may be located at any location of the wearable device 360.

As shown in FIG. 3C, the wearable device 360 is upside down (as compared to the wearable device 320 shown in FIG. 3A). The wearable device 360 may obtain data associated with the orientation or the change in orientation of the wearable device 340 (e.g., orientation data). The orientation data may be obtained from one or more of a gyroscope, a magnetometer, and an accelerometer of the wearable device 360. Based on the orientation data, the wearable device 360 may determine that the orientation of the wearable device 360 has changed (e.g., the device 360 is now upside down). Based on the orientation data, the wearable device 340 may determine that Mic2 is now closer to the user 350 than Mic1. The wearable device 320 may re-designate Mic2 as a primary microphone for detecting sound from the user 350 and re-designate Mic1 as a secondary microphone for detecting background noise. The two microphones Mic1 and Mic2 may be used to reduce (e.g., cancel out) the background noise from the detected sounds.

It should noted that although the devices 310, 330 and 350 are shown as moving only within single plane (e.g., rotating about the center) in FIGS. 3A-3C, in other embodiments the wearable devices 310, 330, and 350 may move in any axis of motion, plane, and/or direction. The wearable devices 310, 330, and 350 may detect any change in orientation and/or any change in position (e.g., orientation data) and may re-designate different microphones as primary or secondary microphones, based on the orientation data.

Figure 4:
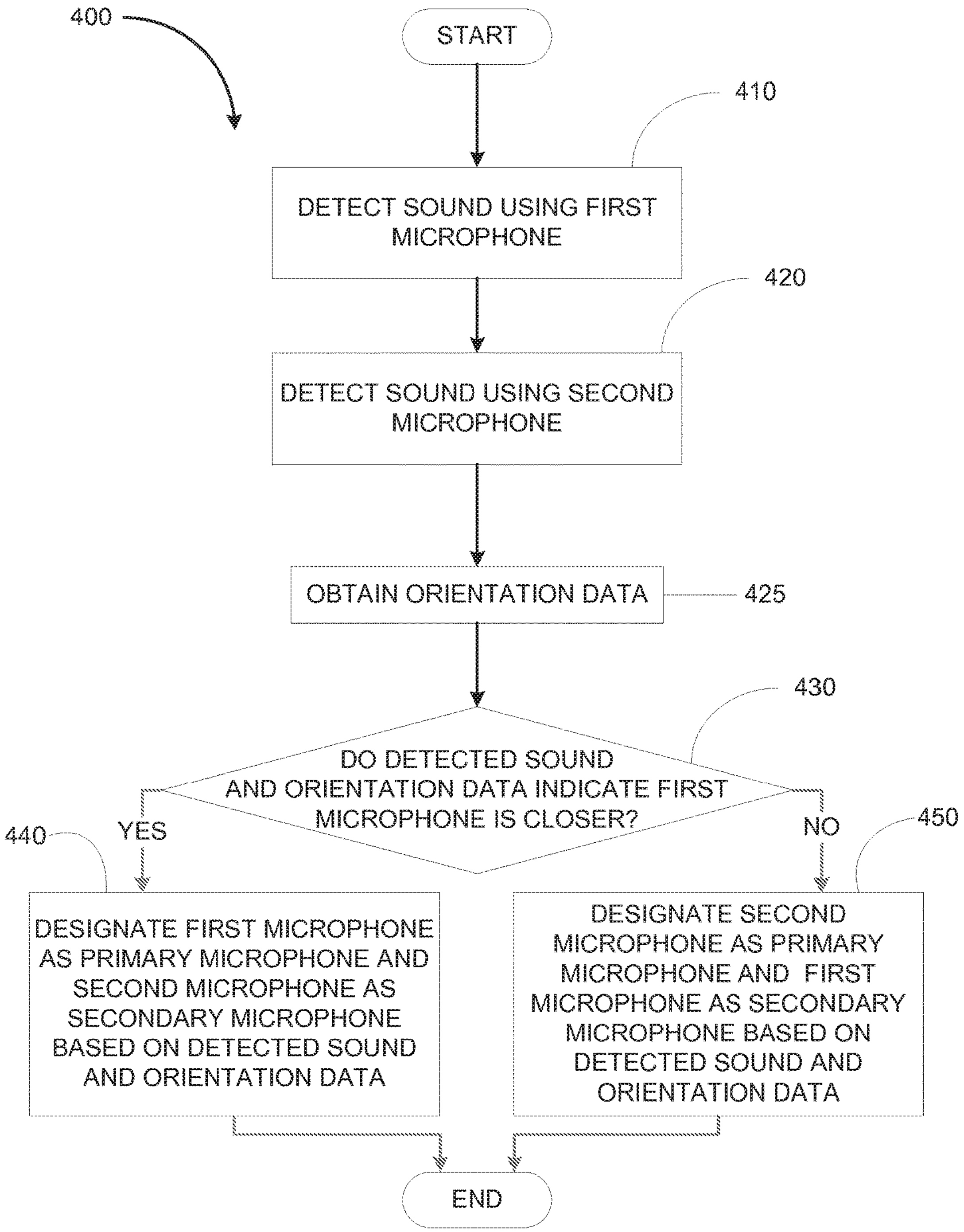
FIG. 4 is a flow diagram of an embodiment of a method for using two microphones in the wearable device.

FIG. 4 is a flow diagram of an embodiment of a method 400 for using two microphones in the wearable device. The method 400 may be performed by processing logic that may comprise hardware (circuitry, dedicated logic, etc.), software (such as is run on a general purpose computer system or a dedicated machine), or a combination of both. In one embodiment, the method 400 is performed by a user device (e.g., wearable device 100 of FIG. 1). The method 400 may be used to perform an initial designation of primary and secondary microphones.

Referring to FIG. 4, the method 400 starts at block 410, where the wearable device detects sound from a desired source using a first microphone. The wearable device then detects sound from the desired source using a second microphone (block 420). After detecting sound from the first and second microphones, the wearable device obtains orientation data at block 425. The orientation data may be obtained from one or more of an accelerometer, a magnetometer, and a gyroscope in the wearable device. In one embodiment, the orientation data may indicate the current position and/or orientation of the wearable device. In another embodiment, the orientation data may indicate a change in the current position and/or orientation of the wearable device. Based on the orientation data, the wearable device may determine the orientation of the device. For example, the wearable device may determine that the device is right side up (e.g., as shown in FIG. 3A) or upside down (as shown in FIG. 3C). In another example, the wearable device may determine that the wearable device is on its side (e.g., laying flat on a surface). At block 430, the wearable device determines whether the sounds detected by the first and second microphone and the orientation data indicate that the first microphone is closer to the desired sound source. For example, if the sound detected by Mic1 (on the top of the wearable device) detects the desired sound more loudly and the device is right-side up, this may indicate that Mic1 is closer to the desired sound source. In one embodiment, the wearable device may determine which of the first and second microphone is closer to the desired sound source based on the orientation data only.

If the detected sound is louder at the first microphone, this may indicate that the first microphone is closer to the desired sound source. In addition, the orientation data may indicate that the first microphone may be closer to the sound source than the second microphone (e.g., if the wearable device is right-side up, then the microphone on the top of the wearable device is most likely to be closer to the desired sound source). The wearable device designates the first microphone as the primary microphone and the second microphone as the secondary microphone based on the sound detected by the first and second microphones, and based on the orientation data at block 440. If the detected sound is louder at the second microphone, this may indicate that the second microphone is closer to the desired sound source. In addition, the orientation data may indicate that the second microphone may be closer to the sound source than the first microphone (e.g., if the wearable device is up-side down, then the microphone on the bottom of the wearable device is most likely to be closer to the desired sound source). The wearable device designates the second microphone as the primary microphone and the first microphone as the secondary microphone based on the sound detected by the first and second microphones, and based on the orientation data at block 450.

In one embodiment, the wearable device may transmit the orientation data and the detected sounds to a server (e.g., real time data monitoring server 36 in FIG. 2). The server may determine which of the first and second microphone is closest to the desired sound source, based on the orientation data and the detected sounds. The server may instruct (e.g., send a command or a message) the wearable device to designate one microphone as a primary microphone and another microphone as the secondary microphone based one or more of the detected sounds and the orientation data.

Figure 5:
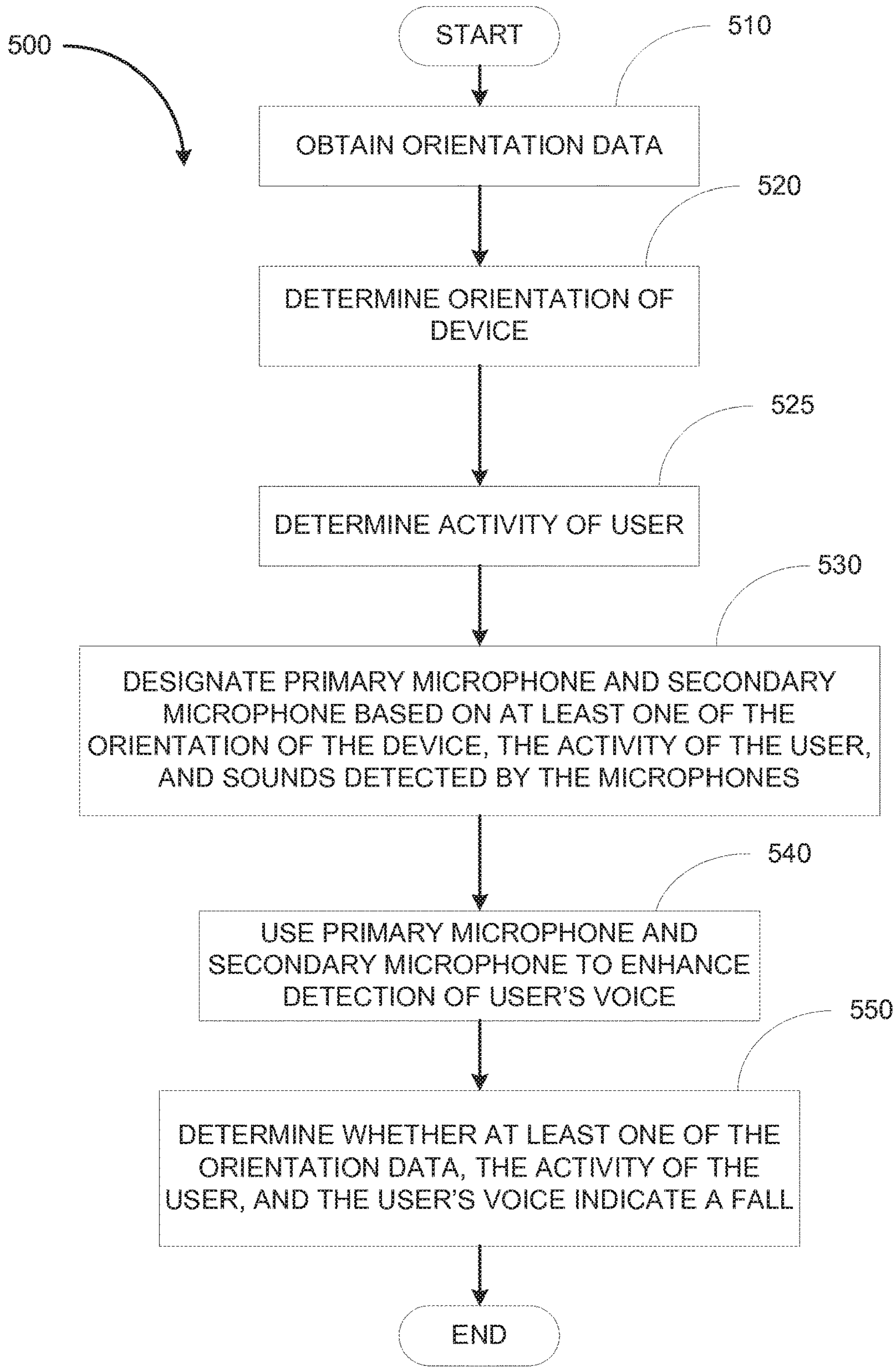
FIG. 5 is a flow diagram of an embodiment of a method for designating a primary microphone and a secondary microphone.

FIG. 5 is a flow diagram of an embodiment of a method 500 for designating a primary microphone and a secondary microphone. The method 500 may be performed by processing logic that may comprise hardware (circuitry, dedicated logic, etc.), software (such as is run on a general purpose computer system or a dedicated machine), or a combination of both. In one embodiment, the method 500 is performed by a user device (e.g., wearable device 100 of FIG. 1).

Referring to FIG. 5, the method 500 begins at block 510 where the wearable device obtains orientation data. The orientation data may be obtained from one or more of an accelerometer, a magnetometer, and a gyroscope in the wearable device. In one embodiment, the orientation data may indicate the current position and/or orientation of the wearable device. In another embodiment, the orientation data may indicate a change in the current position and/or orientation of the wearable device. Based on the orientation data, the wearable device determines the orientation of the device at block 520. For example, the wearable device may determine that the device is right side up (e.g., as shown in FIG. 3A) or upside down (as shown in FIG. 3C). In another example, the wearable device may determine that the wearable device is on its side (e.g., laying flat on a surface). At block 525, the wearable device may determine an activity of the user. For example, the wearable device may determine whether the user is running, walking, lying down, walking up/down stairs, etc. The wearable device may determine the activity of the user using the orientation data. In one embodiment, the wearable device may collect orientation data over period of time (e.g., 5 seconds, 10 seconds, 1 minute, etc.) to determine the activity of the user.

The wearable device designates a primary microphone and a secondary microphone based on at least one of the orientation of the device, the activity of the user, and sounds detected by the microphones (block 530). For example, as shown in FIG. 3A, the wearable device may designate Mic1 as the primary microphone and Mic2 as the secondary microphone because the wearable device is right side up, the user is walking, and the user's voice is detected more loudly at Mic1. In one embodiment, the wearable device may designate the primary microphone and the secondary microphone based on the orientation data or the user activity alone. At block 540, the primary microphone and the secondary microphone are used to enhance detection of the user's voice. For example, the primary microphone may be used to detected the user's voice and the secondary microphone may be used for noise cancelling purposes (e.g., to detect background noise). Based on at least one of the orientation data, the user activity, and the user's voice (e.g., sound) detected by the microphones, the wearable device may determine whether the user has fallen (block 550). In one embodiment, the wearable device may determine whether at least one of the orientation data, the user activity, and the user's voice (e.g., sound) detected by the microphones indicate that a predefined user state has occurred at block 550. For example, a predefined user state may occur if a user has slipped, tripped, fallen, is lying down, bent over, etc. The wearable device may detect the user's voice (e.g., screams of pain or cries for help) to determine that the user state has changed (e.g., that the user has fallen and/or is injured). The wearable device may perform certain actions (e.g., initiate a phone call to emergency services) based on the determination of whether or not the user has fallen or whether a predefined user state has occurred.

In one embodiment, the wearable device may detect noises caused by a change in user state (e.g., vibrations, noises, or sounds caused by a fall or movement of the device). For example, if a user has fallen, the wearable device may impact a surface (e.g., the floor). The noise generated by the impact (e.g., a "clack" noise as the wearable device hits the floor) may be detected by the secondary microphone. The noise caused by the movement (and detected by the secondary microphone) may be represented and/or stored as noise data by the wearable device. The wearable device may use the noise data to remove the noise caused by the movement from the sound detected by the secondary microphone. For example, the "clack" noise detected by the secondary microphone may be removed from the sounds received by both the primary and secondary microphone to better detect a user's yell/scream when the user slips or falls. In another embodiment, the orientation data may also be used by noise-cancelling algorithms in order to remove additional noises caused by a user activity or movement which changes the orientation of the device.

In one embodiment, the wearable device may transmit the orientation data to a server (e.g., real time data monitoring server 36 in FIG. 2). The server may determine the activity of the user, based on the orientation data. The server may also determine which of the first and second microphone is closest to the desired sound source, based on the orientation data and the user activity. The server may instruct (e.g., send a command or a message) the wearable device to designate one microphone as a primary microphone and another microphone as the secondary microphone.

Figure 6:
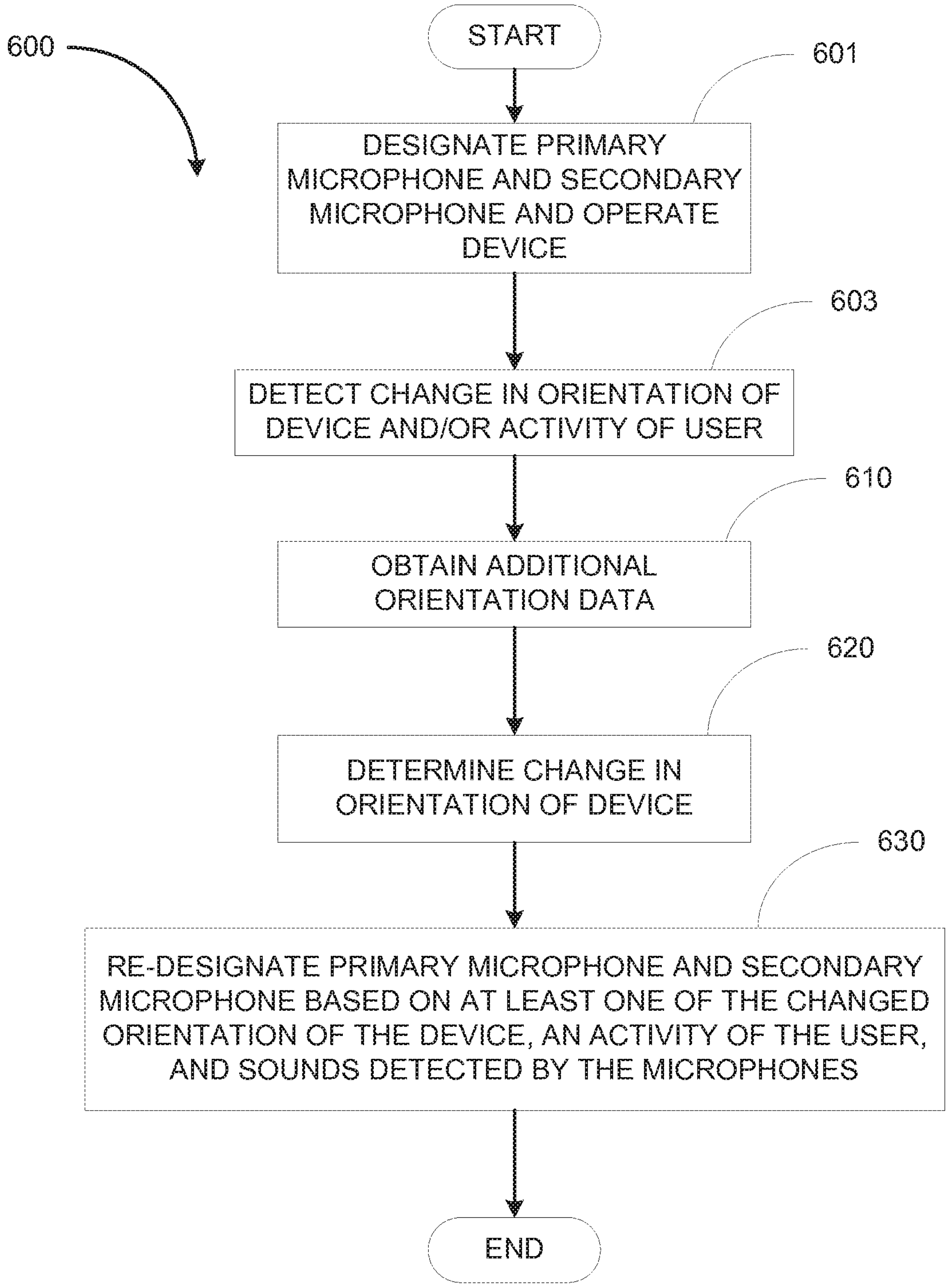
FIG. 6 is a flow diagram of another embodiment of a method for designating a primary microphone and a secondary microphone.

FIG. 6 is a flow diagram of another embodiment of a method 600 for designating a primary microphone and a secondary microphone. The method 600 may be performed by processing logic that may comprise hardware (circuitry, dedicated logic, etc.), software (such as is run on a general purpose computer system or a dedicated machine), or a combination of both. In one embodiment, the method 600 is performed by a user device (e.g., wearable device 100 of FIG. 1). In one embodiment, the method 600 may be performed after one or more of method 400 (shown in FIG. 4) and method 500 (shown in FIG. 5) are performed. For example, method 600 may be performed after the first microphone has already been designated as the primary microphone and the second microphone has been designated as the secondary microphone. If the wearable device changes orientation, the method 600 may be performed to re-designate the primary and secondary microphones, based on the change in orientation.

Referring to FIG. 6, the method 600 beings at block 601 wherein the wearable device designates a primary microphone and a secondary microphone. The wearable device operates for a period of time (e.g., detects sounds) after the designation of the microphones. At block 603, the wearable device detects a change in orientation and/or a change in the activity of a user. For example, the wearable device may detect or determine that a user is now lying down, instead of standing up, or that a user has fallen. The wearable device obtains additional orientation data at block 610. The additional orientation data may be obtained from one or more of an accelerometer, a magnetometer, and a gyroscope in the wearable device. In one embodiment, the additional orientation data may indicate the current position and/or orientation of the wearable device. In another embodiment, the additional orientation data may indicate a change in the current position and/or orientation of the wearable device. Based on the additional orientation data, the wearable device determines the change in the orientation of the device at block 620. For example, the wearable device may determine that the orientation of the device has changed from right side up (e.g., as shown in FIG. 3A) to upside down (as shown in FIG. 3C).

At block 630, the wearable device re-designates the primary microphone and secondary microphone based on at least one of the changed orientation of the device, an activity of the user, and the sounds detected by the microphones. For example, referring to FIGS. 3A and 3C, the wearable device may determine that the orientation of the device has changed from a first orientation (right side up as shown in FIG. 3A) to the second orientation of the device (upside down as shown in FIG. 3C). The wearable device may re-designate Mic2 as the primary microphone and Mic1 as the secondary microphone based on the second orientation of the device.

In one embodiment, the wearable device may transmit the orientation data and the detected sounds to a server (e.g., real time data monitoring server 36 in FIG. 2). The server may determine which of the microphones is closest to the desired sound source, based on at least one of the orientation data, user activity, and the detected sounds. The server may instruct (e.g., send a command or a message to) the wearable device to re-designate one microphone as a primary microphone and another microphone as the secondary microphone based one or more of the detected sounds, a user activity, and the orientation data.

In one embodiment, the microphones in the wearable device are re-designated only if the orientation data exceeds a threshold or criterion. For example, the microphones may be re-designated if the wearable device has tilted or moved by a certain amount. In another example, the microphones may be re-designated if the wearable device has moved for a certain time period (e.g., the wearable device remains in a new orientation for a period of time). This may allow the wearable to conserve power, because the obtaining of the orientation data, the analyzing of the orientation data, and the re-designating of the microphones, do not happen each time the orientation of the wearable device changes and less power is used by the device.

In another embodiment, the frequency with which the wearable device obtains orientation data and/or additional orientation data may vary depending on the activity of the user. For example, if a user is running while holding or wearing the wearable device, then the wearable device may obtain orientation data and/or additional orientation data more often, because it is more likely that the orientation of the device will change.

The table below (Table 1) provides some exemplary designations of primary and secondary microphones according to certain embodiments. As shown in the embodiments below, the designations of the microphones may be based on one or more of the orientation of

TABLE 1

| | Standing | Lying Down | Running |
|---|---|---|---|
| Vertical | Mic1 - Primary<br>Mic2 - Secondary | Mic2 - Primary<br>Mic1 - Secondary | Mic1 - Secondary<br>Mic2 - Primary |
| Horizontal | Mic2 - Primary<br>Mic1 - Secondary | Mic1 - Secondary<br>Mic2 - Primary | |
| Diagonal | Mic2 - Primary<br>Mic1 - Secondary | | |
| Upside Down | Mic1 - Secondary<br>Mic2 - Primary | Mic2 - Secondary<br>Mic1 - Primary | |

It should be noted that numerous variations of mechanisms discussed above can be used with embodiments of the present invention without loss of generality. For example, a person skilled in the art would also appreciate that the complete method described in FIGS. 4, 5, and 6 may be executed on a single embedded processor incorporated within the wearable device 100. A person skilled in the art would also appreciate that, in addition to accelerometers, magnetometers and gyroscopes, other types of devices may be used to determine the orientation of the wearable device.

Returning to FIG. 1, the device 100 may also include a main memory (e.g., read-only memory (ROM), flash memory, dynamic random access memory (DRAM) such as synchronous DRAM (SDRAM)), a static memory (e.g., flash memory, static random access memory (SRAM)), and a data storage device, which communicate with each other and the processor 38 via a bus. Processor 38 may represent one or more general-purpose processing devices such as a microprocessor, distributed processing unit, or the like. More particularly, the processor 38 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 38 may also be one or more special-purpose processing devices such as an application specific integrated circuit (ASIC), a field programmable gate array (FPGA), a digital signal processor (DSP), network processor, or the like. The processor 38 is configured to perform the operations and/or functions discussed herein.

The user device 38 may further include a video display unit (e.g., a liquid crystal display (LCD) or a cathode ray tube (CRT)), an input device (e.g., a keyboard or a touch screen), and a drive unit that may include a computer-readable medium on which is stored one or more sets of instructions embodying any one or more of the methodologies or functions described herein. These instructions may also reside, completely or at least partially, within the main memory and/or within the processor 38 during execution thereof by the wearable device 100, the main memory and the processor also constituting computer-readable media.

The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies discussed herein. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining," "determining," "designating," "receiving," "re-designating," "removing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A wearable device comprising:

a low-power processor;

a high-power processor, computational capacity and power consumption of the high-power processor being greater than computational capacity and power consumption of the low-power processor;

at least one sensor comprising at least one of a magnetometer and an accelerometer;

a gyroscope; and one or more microphones, the low-power processor configured to:

obtain, from the at least one sensor, first orientation data associated with the wearable device; and identify a suspected user state of a user of the wearable device based on the first orientation data;

the high-power processor configured to:

receive the suspected user state from the low-power processor; and correlate second orientation data obtained by the gyroscope with audio data obtained by the one or more microphones to categorize the suspected user state as one of a plurality of user states, the plurality of user states comprising a physical state, an emotional state, an activity of daily life, or an inconclusive event.

2. The wearable device of claim 1, wherein the audio data comprises at least one of a type, number, and frequency of sounds originating from at least one of the user of the wearable device, the user's body, and the environment.

3. The wearable device of claim 1, wherein the one or more microphones comprises first and second microphones.

4. The wearable device of claim 3, wherein at least one of the low-power processor and the high-power processor is configured to:

determine, based on the first orientation data, which of the first and second microphones is closest to a target sound source;

designate the one of the first and second microphones determined to be closest to the target sound source as a primary microphone for detecting sound from the sound source; and designate the other of the first and second microphones as a secondary microphone for detecting background noise.

5. The wearable device of claim 4, wherein at least one of the low-power processor and the high-power processor is configured to:

obtain noise data from the secondary microphone; and remove noise from audio inputs obtained by the primary microphone using the noise data obtained from the secondary microphone.

6. The wearable device of claim 4, wherein at least one of the low-power processor and the high-power processor is configured to:

obtain, from at least one of the at least one sensor and the gyroscope, third orientation data associated with the wearable device; and based on the third orientation data:

determine which of the first microphone and the second microphone is closest to the target sound source;

re-designate the one of the first microphone and the second microphone determined to be closest to the target sound source as a primary microphone for detecting sound from the target sound source; and re-designate the other of the first microphone and the second microphone as a secondary microphone for detecting background noise.

7. The wearable device of claim 6, wherein the at least one of the low-power processor and the high-power processor re-designates the first microphone and the second microphone if the third orientation data exceeds a threshold.

8. The wearable device of claim 6, wherein a time period between obtaining the first orientation data and obtaining the third orientation data is based on an activity of a user.

9. The wearable device of claim 4, wherein designating the one of the first microphone and the second microphone determined to be closest to the target sound source as the primary microphone and designating the other of the first microphone and the second microphone as the secondary microphone is further based on an activity of a user.

10. The wearable device of claim 4, wherein designating the one of the first microphone and the second microphone determined to be closest to the target sound source as the primary microphone and designating the other of the first microphone and the second microphone as the secondary microphone is further based on an instruction from a server device configured to analyze the first orientation data.

11. A method comprising:

obtaining, by a low-power processor of a wearable device from at least one sensor comprising at least one of a magnetometer and an accelerometer included in the wearable device, first orientation data associated with the wearable device;

identifying, by the low-power processor, a suspected user state of a user of the wearable device based on the first orientation data;

receiving, by a high-power processor of the wearable device, the suspected user state from the low-power processor; and correlating second orientation data obtained by a gyroscope of the wearable device with audio data obtained by one or more microphones of the wearable device to categorize the suspected user state as one of a plurality of user states, the plurality of user states comprising a physical state, an emotional state, an activity of daily life, or an inconclusive event, wherein computational capacity and power consumption of the high-power processor being greater than computational capacity and power consumption of the low-power processor.

12. The method of claim 11, wherein the audio data comprises at least one of a type, number, and frequency of sounds originating from at least one of the user of the wearable device, the user's body, and the environment.

13. The method of claim 11, wherein the one or more microphones comprises first and second microphones.

14. The method of claim 13, further comprising:

determining, by at least one of the low-power processor and the high-power processor, which of the first and second microphones is closest to a target sound source based on the first orientation data;

designating the one of the first and second microphones determined to be closest to the target sound source as a primary microphone for detecting sound from the sound source; and designating the other of the first and second microphones as a secondary microphone for detecting background noise.

15. The method of claim 14, further comprising:

obtaining, by at least one of the low-power processor and the high-power processor, noise data from the secondary microphone; and removing noise from audio inputs obtained by the primary microphone using the noise data obtained from the secondary microphone.

16. The method of claim 14, further comprising:

obtaining, by at least one of the low-power processor and the high-power processor from at least one of the at least one sensor and the gyroscope, third orientation data associated with the wearable device; and based on the third orientation data:

determining which of the first microphone and the second microphone is closest to the target sound source;

re-designating the one of the first microphone and the second microphone determined to be closest to the target sound source as a primary microphone for detecting sound from the target sound source; and re-designating the other of the first microphone and the second microphone as a secondary microphone for detecting background noise.

17. The method of claim 16, wherein the at least one of the low-power processor and the high-power processor re-designates the first microphone and the second microphone if the third orientation data exceeds a threshold.

18. The method of claim 16, wherein a time period between obtaining the first orientation data and obtaining the third orientation data is based on an activity of a user.

19. The method of claim 14, wherein designating the one of the first microphone and the second microphone determined to be closest to the target sound source as the primary microphone and designating the other of the first microphone and the second microphone as the secondary microphone is further based on an activity of a user.

20. The method of claim 14, wherein designating the one of the first microphone and the second microphone determined to be closest to the target sound source as the primary microphone and designating the other of the first microphone and the second microphone as the secondary microphone is further based on an instruction from a server device configured to analyze the first orientation data.

* * * * *